US011144377B2

(12) United States Patent
Grealish et al.

(10) Patent No.: US 11,144,377 B2
(45) Date of Patent: Oct. 12, 2021

(54) SYSTEMS AND METHODS FOR CORRELATING ERRORS TO PROCESSING STEPS AND DATA RECORDS TO FACILITATE UNDERSTANDING OF ERRORS

(71) Applicant: Microsoft Technology Licensing, LLC, Redmond, WA (US)

(72) Inventors: Kevin David James Grealish, Redmond, WA (US); Euan Garden, Redmond, WA (US); Craig Allen Lee, Redmond, WA (US); Jose Ramon Calzada Gomez, Redmond, WA (US); Michael James Coulson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 16/428,943

(22) Filed: May 31, 2019

(65) Prior Publication Data
US 2019/0286512 A1 Sep. 19, 2019

Related U.S. Application Data

(63) Continuation of application No. 15/337,014, filed on Oct. 28, 2016, now Pat. No. 10,338,986.

(51) Int. Cl.
*G06F 11/00* (2006.01)
*G06F 11/07* (2006.01)
*G06F 11/36* (2006.01)

(52) U.S. Cl.
CPC ...... *G06F 11/0775* (2013.01); *G06F 11/0709* (2013.01); *G06F 11/0724* (2013.01);
(Continued)

(58) Field of Classification Search
None
See application file for complete search history.

(56) References Cited

U.S. PATENT DOCUMENTS

| 8,589,880 B2* | 11/2013 | Jones | G06F 8/20 |
| | | | 717/124 |
| 2005/0209841 A1* | 9/2005 | Arning | G06F 11/1402 |
| | | | 703/22 |

(Continued)

OTHER PUBLICATIONS

Google Scholar/Patents Search—text refined (Year: 2020).*
Google Scholar/Patents—text refined (Year: 2021).*

*Primary Examiner* — Christopher S McCarthy (57) ABSTRACT

A computer program file or a sequence of processing steps from an authoring environment of a data processing system is used to generate a graph including nodes representing the processing steps is generated. Unique identifiers (tags) are assigned to the nodes. One or more processing steps are optionally modified while preserving the original identifiers. If an error occurs during execution, error information is saved including the processing step that failed and data records that triggered the failure. The identifier of the failed processing step is attached to the error information. The error information is collected and processed. The collected error information is used to correlate the error to the failed processing step and to data records triggering the error using the identifier of the failed processing step recorded with the error information. The correlated error information indicates cause and location of the error.

20 Claims, 6 Drawing Sheets

(52) U.S. Cl.
CPC ...... *G06F 11/0784* (2013.01); *G06F 11/3628* (2013.01); *G06F 11/3692* (2013.01)

(56) References Cited

U.S. PATENT DOCUMENTS

2014/0245079 A1* 8/2014 Larson ................ G06F 11/0724
                                                                714/48
2017/0132060 A1* 5/2017 Nomura .............. G06F 11/0751

* cited by examiner

SYSTEMS AND METHODS FOR CORRELATING ERRORS TO PROCESSING STEPS AND DATA RECORDS TO FACILITATE UNDERSTANDING OF ERRORS

CROSS REFERENCE TO RELATED APPLICATIONS

This application is a continuation of and claims priority to U.S. application Ser. No. 15/337,014, entitled "SYSTEMS AND METHODS FOR CORRELATING ERRORS TO PROCESSING STEPS AND DATA RECORDS TO FACILITATE UNDERSTANDING OF ERRORS," filed Oct. 28, 2016, which is incorporated herein in its entirety.

FIELD

The present disclosure relates generally to distributed data processing systems and more particularly to systems and methods for correlating errors to processing steps and data records to facilitate understanding of the errors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data processing systems may sometimes encounter varied, changing, and/or dirty data. Data errors may occur when a data processing system encounters such data. The data processing system may respond to the data errors in different ways. For example, the data processing system may continue processing when the data errors occur so that a single dirty data record does not stop the processing of the rest of the data by the data processing system. Alternatively, the data processing system may incorporate a fast fail policy to report any condition that is likely to indicate a failure and to stop normal operation instead of attempting to continue a possibly flawed process.

Such data errors may be difficult to understand and debug when performing trial runs of data processing systems during the design phase of the data processing systems. Further, such data errors may be difficult to understand and debug when the data processing systems running in a distributed environment process large datasets. Often these data errors are reported via text in log files. The persons responsible for developing or supporting the data processing systems have to analyze the text in the log files and manually correlate the errors and the input data that caused the errors to the processing steps in the data processing program. Accordingly, correlating errors in this manner can be a laborious, cumbersome, and time-consuming process, which can make debugging and understanding the errors difficult and inefficient.

SUMMARY

A system comprises a processor and memory, and machine readable instructions. When executed by the processor and memory, the machine readable instructions are configured to execute a plurality of processing steps to process data in a data processing system distributed over a plurality of nodes in a cluster, each of the processing steps having a unique identifier. The machine readable instructions are configured to collect, from the plurality of nodes, in response to an error occurring on executing a first processing step of the processing steps on the plurality of nodes, information about the error stored on the plurality of nodes, the information about the error including a first identifier associated with the first processing step. The machine readable instructions are configured to process the information about the error from the plurality of nodes to correlate the error to the first processing step based on the first identifier that is associated with the first processing step and that is included in the information about the error stored on the plurality of nodes. The machine readable instructions are configured to generate, based on the processed information, correlation between the error and the first processing step. The correlation between the error and the first processing step indicates a cause and a location of the error.

In other features, the machine readable instructions are further configured to compose a graph including vertices representing the plurality of processing steps and to assign identifiers to the vertices. In response to the error occurring on executing the first processing step on the plurality of nodes in the cluster, the information about the error stored on the plurality of nodes in the cluster includes the first identifier associated with one of the vertices representing the first processing step in the graph.

In other features, the machine readable instructions are further configured to modify one or more of the plurality of processing steps by reordering, consolidating, or discarding the one or more steps prior to executing the plurality of processing steps. The machine readable instructions are further configured to retain identifiers of the one or more processing steps being modified with the modified one or more processing steps to correlate one or more errors to the one or more processing steps in the event of the modification.

In other features, the machine readable instructions are further configured to collect, from the plurality of nodes in the cluster, in response to the error occurring on executing the first processing step on the plurality of nodes in the cluster, one or more records of data triggering the error included in the information about the error stored on the plurality of nodes in the cluster. The machine readable instructions are further configured to process the information about the error from the plurality of nodes in the cluster including the one or more records of data triggering the error to correlate the error to the one or more records of data triggering the error based on the first identifier that is associated with the first processing step and that is included in the information about the error. The machine readable instructions are further configured to generate, based on the processed information, correlation between the error and the one or more records of data triggering the error to provide additional information about the cause and the location of the error.

In other features, the machine readable instructions are further configured to execute the plurality of processing steps in response to receiving one or more commands from a computer program file including text representing the plurality of processing steps. The machine readable instructions are further configured to assign identifiers to different portions of the text in the computer program file to link errors occurring during execution of one or more of the plurality of processing steps to corresponding portions of the text in the computer program file.

In other features, the machine readable instructions are further configured to execute the plurality of processing steps by compiling one or more commands for processing the data and to associate the plurality of processing steps and the corresponding identifiers to respective portions of the one or more commands to identify a portion of the one or more commands causing the error.

In other features, the machine readable instructions are further configured to generate information at each of the plurality of nodes for less than or equal to a predetermined number of errors. The machine readable instructions are further configured to collect information from each of the plurality of nodes about less than or equal to a predetermined number of tags. The machine readable instructions are further configured to provide the correlation for less than or equal to a predetermined number of errors.

In other features, the plurality of processing steps process the data in a batch processing mode and/or a streaming mode.

In still other features, a method for correlating errors in a data processing system comprises executing a plurality of processing steps to process data in a data processing system distributed over a plurality of nodes in a cluster, each of the processing steps having a unique identifier. The method further comprises collecting, from the plurality of nodes, in response to an error occurring on executing a first processing step of the processing steps on the plurality of nodes, information about the error stored on the plurality of nodes, the information about the error including a first identifier associated with the first processing step. The method further comprises processing the information about the error from the plurality of nodes to correlate the error to the first processing step based on the first identifier that is associated with the first processing step and that is included in the information about the error stored on the plurality of nodes. The method further comprises generating, based on the processed information, correlation between the error and the first processing step. The correlation between the error and the first processing step indicates a cause and a location of the error.

In other features, the method further comprises composing a graph including vertices representing the plurality of processing steps and assigning identifiers to the vertices. The method further comprises including, in response to the error occurring on executing the first processing step on the plurality of nodes in the cluster, in the information about the error stored on the plurality of nodes in the cluster, the first identifier associated with one of the vertices representing the first processing step in the graph.

In other features, the method further comprises modifying one or more of the plurality of processing steps by reordering, consolidating, or discarding the one or more steps prior to executing the plurality of processing steps. The method further comprises retaining identifiers of the one or more processing steps being modified with the modified one or more processing steps to correlate one or more errors to the one or more processing steps in the event of the modification.

In other features, the method further comprises collecting, from the plurality of nodes in the cluster, in response to the error occurring on executing the first processing step on the plurality of nodes in the cluster, one or more records of data triggering the error included in the information about the error stored on the plurality of nodes in the cluster. The method further comprises processing the information about the error from the plurality of nodes in the cluster including the one or more records of data triggering the error to correlate the error to the one or more records of data triggering the error based on the first identifier that is associated with the first processing step and that is included in the information about the error. The method further comprises generating, based on the processed information, correlation between the error and the one or more records of data triggering the error to provide additional information about the cause and the location of the error.

In other features, the method further comprises executing the plurality of processing steps in response to receiving one or more commands from a computer program file including text representing the plurality of processing steps. The method further comprises assigning identifiers to different portions of the text in the computer program file to link errors occurring during execution of one or more of the plurality of processing steps to corresponding portions of the text in the computer program file.

In other features, the method further comprises executing the plurality of processing steps by compiling one or more commands for processing the data. The method further comprises associating the plurality of processing steps and the corresponding identifiers to respective portions of the one or more commands to identify a portion of the one or more commands causing the error.

In other features, the method further comprises generating information at each of the plurality of nodes for less than or equal to a predetermined number of errors. The method further comprises collecting information from each of the plurality of nodes about less than or equal to a predetermined number of tags. The method further comprises providing the correlation for less than or equal to a predetermined number of errors.

In still other features, a system for correlating errors in a data processing system comprises a processor and memory, and machine readable instructions. When executed by the processor and memory, the machine readable instructions are configured to execute a plurality of processing steps to process data in a data processing system distributed over a plurality of nodes in a cluster, each of the processing steps having a unique identifier. The machine readable instructions are configured to collect, from the plurality of nodes, in response to an error occurring on executing a first processing step of the processing steps on the plurality of nodes, information about the error stored on the plurality of nodes, the information about the error including a first identifier associated with the first processing step and one or more records of data triggering the error. The machine readable instructions are configured to process the information about the error from the plurality of nodes to correlate the error to the first processing step based on the first identifier that is associated with the first processing step and that is included in the information about the error stored on the plurality of nodes. The machine readable instructions are configured to generate, based on the processed information, correlation between the error and at least one of the first processing step and the one or more records of data triggering the error. The correlation between the error and at least one of the first processing step and the one or more records of data triggering the error indicates a cause and a location of the error.

In other features, the machine readable instructions are further configured to compose a graph including vertices representing the plurality of processing steps and to assign identifiers to the vertices. In response to the error occurring on executing the first processing step on the plurality of nodes in the cluster, the information about the error stored on the plurality of nodes in the cluster includes the first identifier associated with one of the vertices representing the first processing step in the graph.

In other features, the machine readable instructions are further configured to modify one or more of the plurality of processing steps by reordering, consolidating, or discarding the one or more steps prior to executing the plurality of processing steps. The machine readable instructions are further configured to retain identifiers of the one or more processing steps being modified with the modified one or more processing steps to correlate one or more errors to the one or more processing steps in the event of the modification.

In other features, the machine readable instructions are further configured to execute the plurality of processing steps by compiling one or more commands for processing the data and to associate the plurality of processing steps and the corresponding identifiers to respective portions of the one or more commands to identify a portion of the one or more commands causing the error.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to systems and methods for correlating errors to processing steps and optionally correlating the errors to the data records that caused the errors when processing data in a distributed data processing system. The systems and methods provide the correlated error information to the users of the data processing system in the context of the data processing step. The systems and methods offer error correlating capabilities to data processing systems executed in both distributed and non-distributed environments. Accordingly, the users of the data processing systems, which allow authoring of data processing programs using processing steps, can readily understand and diagnose the errors since the details about the errors and the input data that caused the errors are correlated with specific processing steps in the data processing program.

When processing data in various formats and processing large quantities of data in particular, a distributed data processing system implemented across a cluster of computers may be utilized for processing the data. The distributed data processing system may clean, reformat, compute, and transform the data into data having a different shape or format. While such distributed data processing speeds up the processing of large datasets, the distributed data processing also complicates the processing of the data and the programming of that processing.

When providing services and systems that enable the distributed processing of data, one aspect of providing a productive experience to those performing the programming and running of the distributed processing jobs is to facilitate diagnosing and understanding the errors. Other goals include simplifying taking actions when jobs fail or when some of the data being processed is not completely processed. Since the error can occur on any one of a number of machines (nodes) in a cluster, traditionally this involves viewing text log files form each machine and then correlating the errors to data processing steps to understand causes of the error.

The systems and methods of the present disclosure, which correlate the errors to processing steps and data records that caused them, enable the persons performing the programming and running of the distributed processing jobs to investigate and fix root causes of such processing errors. The systems and methods can thus increase the productivity of the persons performing the programming and running of the distributed processing jobs.

Specifically, a user of a data processing system may program the data processing system by authoring a computer program including text language or by using a graphical user interface authoring environment of the data processing system to create a sequence of processing steps. The systems and methods of the present disclosure derive a data processing graph (e.g., an acyclic graph explained below) from the computer program or from the sequence of processing steps. Each processing step is assigned a unique identifier or tag. The information about the tags is retained (preserved) even when the graphs are modified (e.g., for optimization as explained below).

When an error occurs during the execution of the processing steps in the graph, the following details are collected from across the distributed processing system: the input record or records that triggered the error (if possible), the details of the error (i.e., the cause of the error), and the identity (i.e., tag) of the data processing step. These details are written on each machine (i.e., a node or a computing device such as a server in the cluster) in the cluster with the tag of the processing step attached thereto, which enables correlating the details. This information is then used to correlate the error to the data processing step and optionally to the data record(s) triggering the error, and the correlated error details are provided to the user in the context of the processing step. The correlated error details enable the user to understand the error and makes debugging such errors easier than existing systems.

The present disclosure is organized as follows. The systems and methods of the present disclosure are explained with reference to FIGS. 1-3. A simplistic example of a distributed environment in which the systems and methods of the present disclosure can be implemented is presented and described with reference to FIGS. 4-6. The systems and methods of the present disclosure are further explained with reference to FIG. 7. Throughout the disclosure, the terms tag and identifier are used interchangeably.

A distributed data processing flow is typically defined, either directly or via a programming language, as an acyclic graph of processing steps. For example, a directed acyclic graph (DAG) includes vertices and edges with each edge directed from one vertex to another. Specifically, a DAG is a directed graph that has a topological ordering, a sequence of vertices such that every edge is directed from an earlier vertex to a later vertex in the sequence. The vertices may also be referred to as nodes representing data processing steps. In a directed graph, a node may receive inputs that may include an output of a preceding node, and a node may produce an output that may be an input to a subsequent node.

Such graphs can be generated in a number of ways. Some systems produce a graph where each step is explicitly declared, while others produce a graph from compiling a language (e.g., SQL, Hive, PIG, U-SQL). Still others provide an application program interface (API) for creating the graph. These data processing graphs may be further modified by the system before being executed, usually to optimize execution efficiency or execution time. Such graphs can be executed on a distributed system as well as on a non-distributed system. While distributed execution is useful for processing large data sets, non-distributed execution is often used for smaller sets of data during development of the data processing flow.

In such data processing systems, when an error occurs on a data processing step (a node in the graph), the data processing system can respond to the error in a number of ways. For example, the data processing system can terminate the entire data processing flow. The data processing system can ignore the error (and consequently the data records that triggered the error) and continue running the flow. The data processing system can log the errors and continue running the flow.

When the errors are logged, the errors and the data records that triggered the errors are difficult to correlate back to the data processing step that encountered the errors. This correlating process is particularly challenging when a data processing step in a flow is executed on multiple machines in a cluster, where each machine logs the errors as the errors occur.

The systems and methods of the present disclosure collect, on any error, the input record or records that triggered the error (if possible), the details of the error, and the identity of the data processing step. These details are collected from across the distributed processing system for the entire data processing job. This information is then used to correlate the errors to the data processing step and to provide the error details in the context of the data processing step to facilitate understanding and debugging such errors.

The data processing steps (data processing nodes in a graph) are identified using tags that are used to track the processing steps. When the graph is modified by the system prior to execution (often for optimization), the nodes of the executed graph have enough information to identify the original graph nodes since the original tag information is preserved in the optimized graph. If the original graph is created from a programming or query language, the nodes of the original graph hold sufficient information to identify the relevant part of the original code (e.g., line number and character position, and optionally length or relevant code), or the processing step identity in a graphically authored computer program.

The ability to collect the input records depends on the operation involved in a processing step since errors can be easily linked to their input records for some operations but not for others, and for some operations, errors can only be linked to all of the input records. For example, when aggregating a numeric value across a large number of records, a numeric overflow error can be attributed to all input records, while a filter operation that raises an error when computing a filter expression with a specific record one can easily collect the input record (or values). Accordingly, the system may not collect input record values for an error or may do so for only a subset of operation types or errors.

The system may limit the size of data collected using several methods. For example, the system may limit the number or size of input records collected for a single failure, a single processing step, on a processing machine, or in total when collecting the details from multiple processing machines. Different policies may be used to determine the amount of error information to collect.

Often when processing large amount of data, an error that will occur for every record would produce more error information than can be handled, displayed, or be useful. Therefore, various policies may be utilized to limit the error information at the point of generation, during collection from various machines, or during display. An example of each follows. When processing data for a node, the number of errors that generate information may be limited (e.g., the policy may be to collect only the first 300 errors). When moving error information from computers processing the data to a common location, the size of data collected may be limited (e.g., the policy may be to collect at most 100 errors per tag from each computer). During display, only the first 120 errors and at most 10 errors for each processing step may be displayed, for example. In an alternate implementation, the error information may also be limited based on total number of bytes used to hold the error information rather than limiting the error information based on the number of errors.

The examples below illustrate generation of graphs from a computer program and from a GUI authoring environment of a data processing system, tagging of the nodes (processing steps) of the graphs, optimization of the graphs, and providing the correlated error information to the user of the data processing system.

Figure 1:
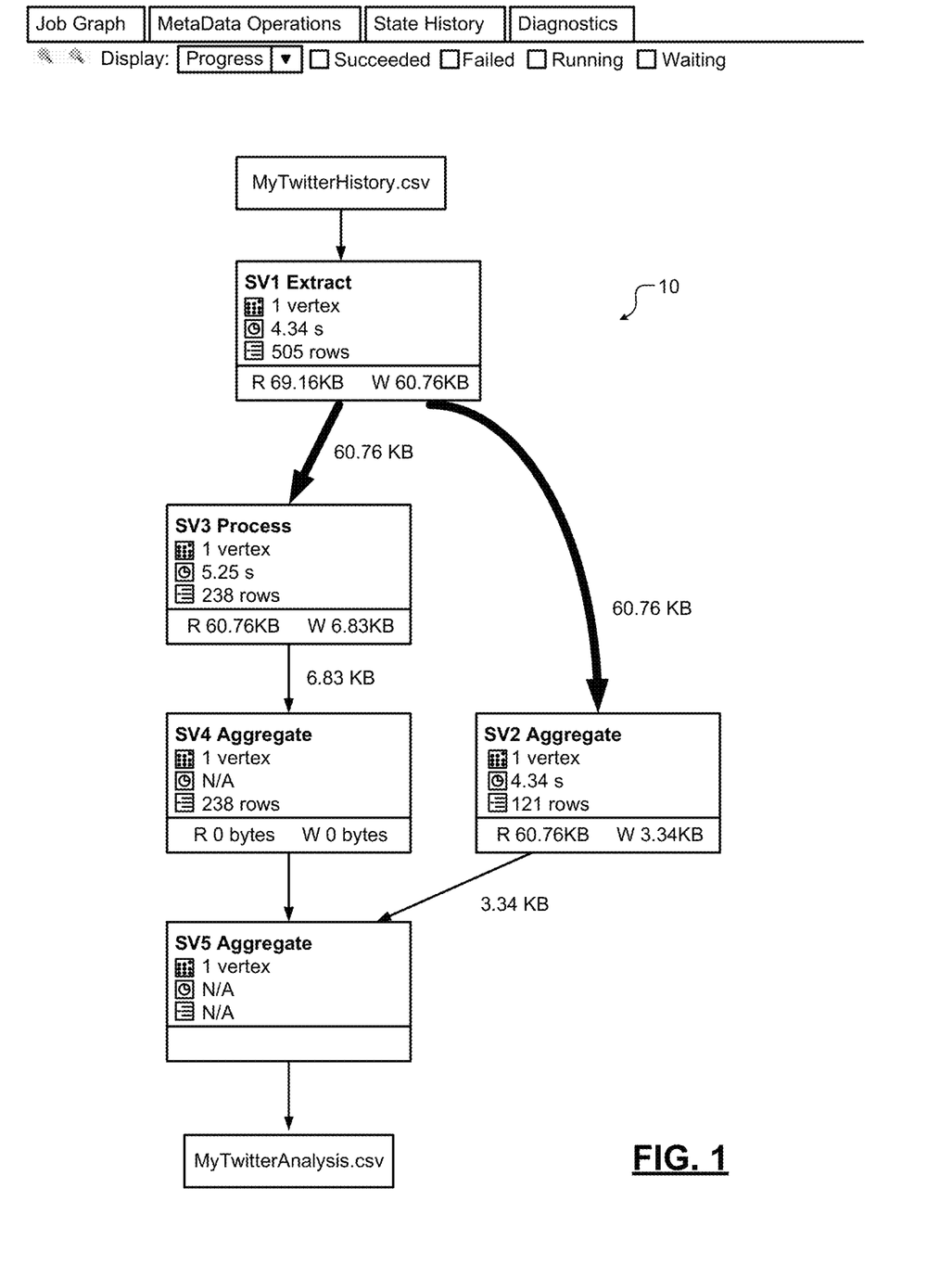
FIG. 1 shows an example of a data processing graph generated from a computer program including instructions for processing data in a distributed data processing system according to the present disclosure.

FIG. 1 shows an example of a processing graph 10 generated by compiling a computer program written in a text language to program a distributed data processing system. Suppose that a user downloaded Twitter history of all of the user's tweets, retweets, and mentions as a CSV file and placed the Twitter history in the user's store (e.g., Microsoft's Azure Data Lake Store). To simply count the number of tweets for each of the authors in the tweet "network," the user can write the following program in U-SQL:

```
@t = EXTRACT date string
       , time string
       , author string
       , tweet string
   FROM "/input/MyTwitterHistory.csv"
   USING Extractors.Csv( );
@res = SELECT author
       , COUNT(*) AS tweetcount
   FROM @t
   GROUP BY author;
   OUTPUT @res TO "/output/MyTwitterAnalysis.csv"
```

```
    ORDER BY tweetcount DESC
    USING Outputters.Csv( );
```

The above U-SQL script shows three major steps of processing the data: First, extracting the data from the user's source. For example, the user schematizes extracting the data in the query with the EXTRACT statement. The datatypes are based on C# datatypes, and the built-in Extractors library is used to read and schematize the CSV file. Second, transforming using SQL and/or custom user defined operators (e.g., a GROUP BY aggregation). Third, outputting the result either into a file or into a U-SQL table to store the result for further processing.

Now suppose that the user wants to add additional information about the people mentioned in the tweets and extend the aggregation to return how often people in the user's tweet network are authoring tweets and how often they are being mentioned. To do so, the user can write the following program in U-SQL:

The user can employ an inline C# LINQ expression to extract the mentions into an ARRAY, turn the array into a rowset with EXPLODE, apply EXPLODE to each row's array with a CROSS APPLY, and union the authors with the mentions but drop the leading @-sign to align with the author values as follows.

```
@t = EXTRACT date string
        , time string
        , author string
        , tweet string
    FROM "/input/MyTwitterHistory.csv"
    USING Extractors.Csv( );
@m= SELECT new SQL.ARRAY<string>(
            tweet.Split(' ').Where(x => x.StartsWith("@"))) AS refs
      FROM @t;
@t = SELECT author, "authored" AS category
      FROM @t
      UNION ALL
      SELECT r.Substring(1) AS r, "mentioned" AS category
      FROM @m CROSS APPLY EXPLODE(refs) AS Refs(r);
@res = SELECT author
        , category
        , COUNT(*) AS tweetcount
      FROM @t
      GROUP BY author, category;
      OUTPUT @res TO "/output/MyTwitterAnalysis.csv"
      ORDER BY tweetcount DESC
      USING Outputters.Csv( );
```

FIG. 1 shows a processing graph 10 formed by compiling this program. In the graph 10, the node labeled "SV5 Aggregate" can be tagged as originating from the code that begins with the line "@res=SELECT . . . " through to the line "GROUP BY author, category;". The tagging process occurs during the compilation of the text code into the processing graph. In addition to linking a segment of a text program into the output of the compilation, the added tagging can be used to link errors that occur during processing back to the text describing that processing in the program.

Figure 2:
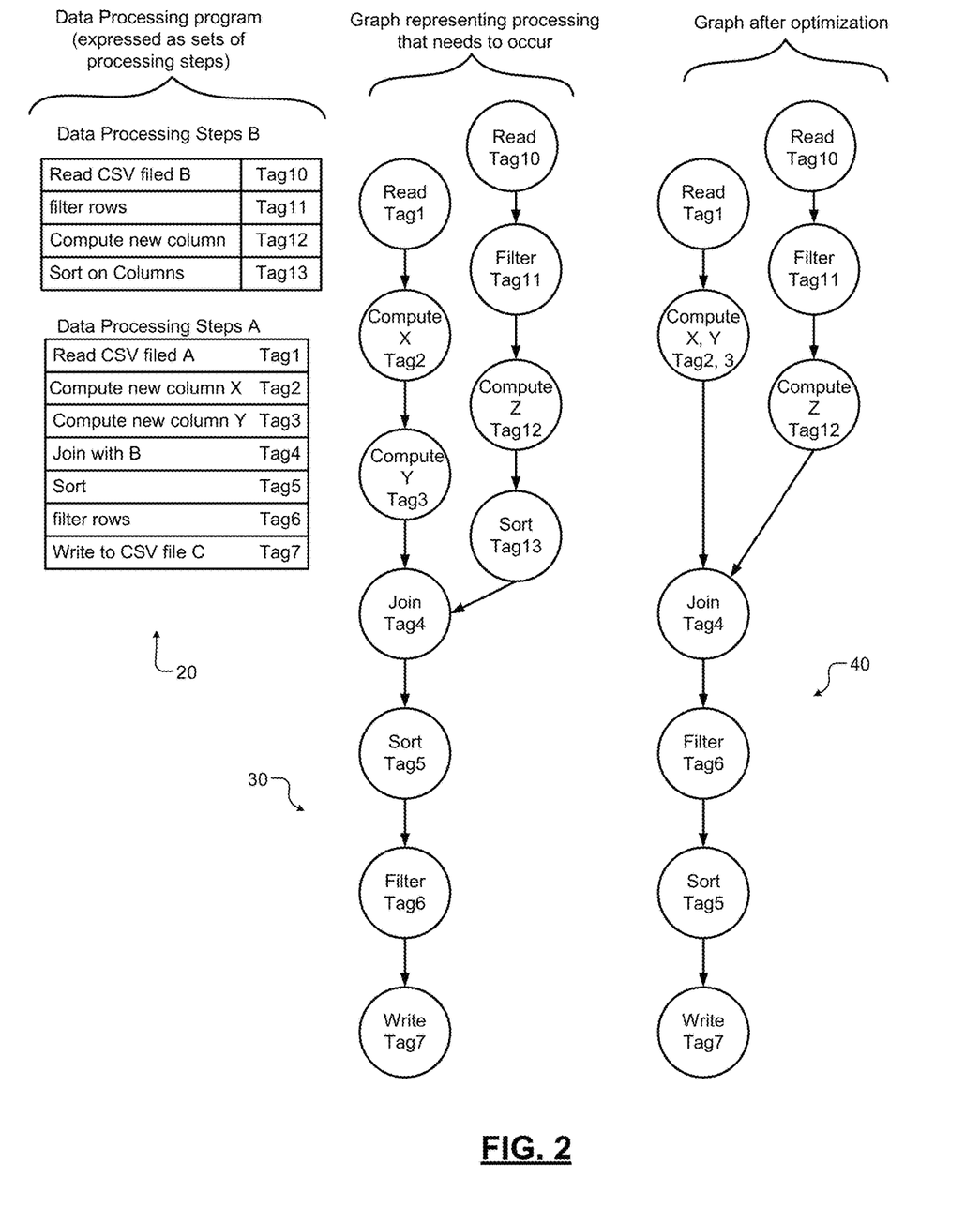
FIG. 2 shows examples of graphs generated from processing steps for processing data in a distributed data processing system according to the present disclosure.

FIG. 2 shows an example of optimizing a graph and preserving tagging information while optimizing the graph. FIG. 2 shows a data processing graph 30 derived not form a text language computer program but from a graphical user interface (GUI) authoring environment of a data processing system, where the user creates named sequences of processing steps (e.g., see data processing steps A and B shown at 20). Each step has arguments. Each step (a unit of a program when authoring) has a unique tag that is copied into the graph.

A graph 40 is an optimized version of the graph 30. A graph representing a data processing program can be modified (mutated) before execution to improve execution time. Optimization can include removing some processing steps (e.g., in the example shown, a redundant sort is removed), reordering of some processing steps (e.g., in the example shown, a sort is moved to after a filter so there is less data to sort) or any other kind of replacement or alteration of nodes (processing steps). For example, in the example shown, computing new values is combined into a single pipelined operation. Tags assigned to the nodes in the original graph are preserved through the optimization process. Some tags are combined while others can be lost when the optimization combines or deletes processing nodes. When errors occur during processing described in the optimized graph, the tag of the corresponding graph node is recorded along with the error information (the processing step and the record triggering the error). Accordingly, the error information associated with that processing step can be correlated and provided to the user.

Figure 3:
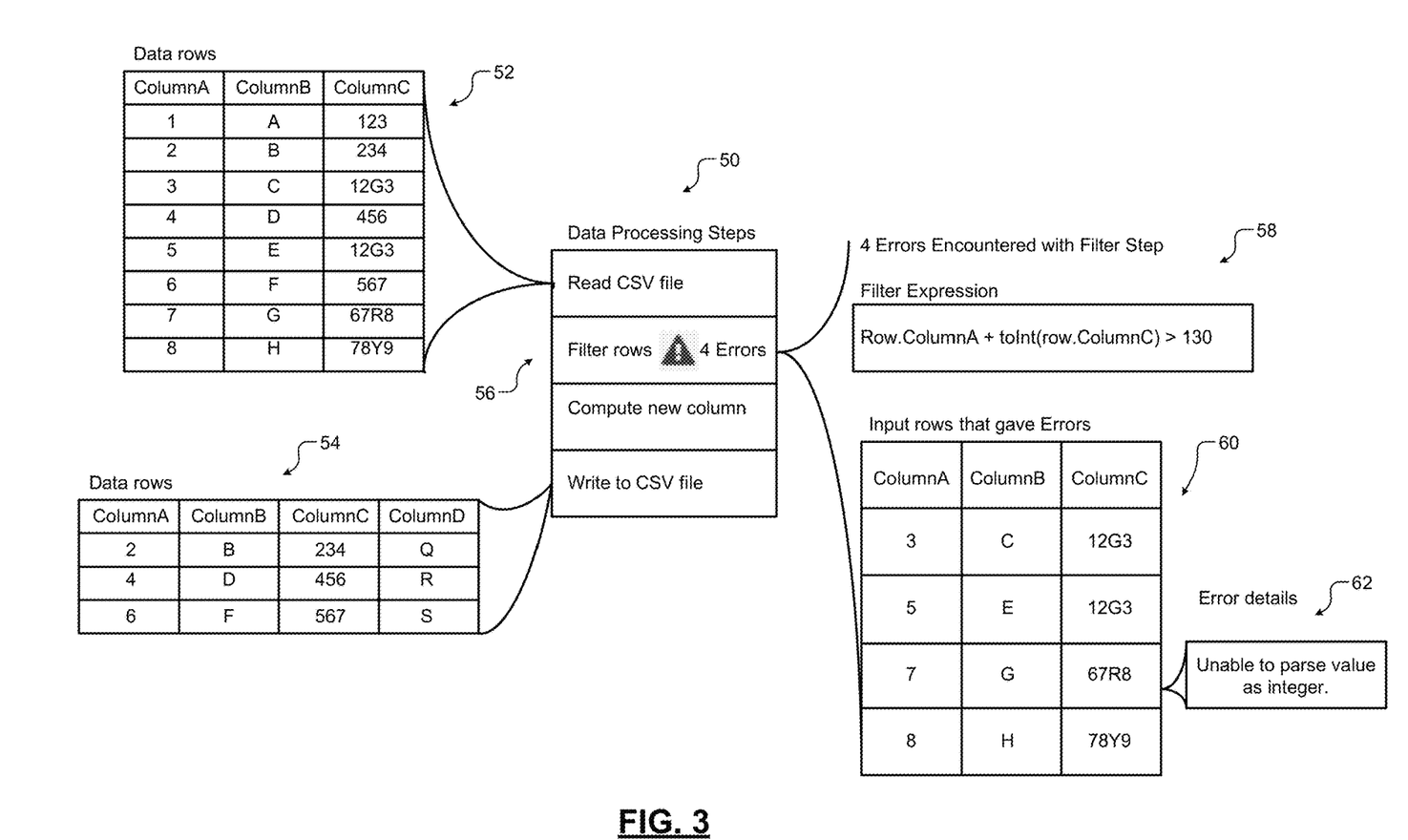
FIG. 3 shows an example of providing correlated error information to a user of a distributed data processing system according to the present disclosure.

FIG. 3 shows an example of providing correlated error information to the user in the context of the data processing step. An example of data processing steps to be performed by the data processing system as desired by the user is shown at 50. While not shown, before execution, the data processing steps 50 will be used to generate a graph such as the graph 30 shown in FIG. 2, tags will be assigned to each node of the graph representing a respective data processing step as shown in FIG. 2, and the graph may be optionally optimized to produce a graph such as the graph 40 shown in FIG. 2 while preserving the original tagging information.

Examples of contents of input and output CSV files associated with the processing steps 50 are shown at 52 and 54, respectively. On execution, as an example, an occurrence of four errors for the filtering step is shown at 56. The filter expression in the filtering step is shown at 58. The input rows from the input data rows shown at 52 that triggered the four errors are shown in detail at 60. Additional error detail regarding what caused the error for one of the rows is shown at 62. While not shown, similar error details can be shown for each row shown at 60. Thus, the four errors are correlated with the filtering processing step and with the data records that triggered the four errors, and the correlated error information is provided to the user in the context of the filtering processing step.

The correlation is made possible by the tag associated with the filtering processing step. When the errors occur, the error information (the filtering processing step and the data records that triggered the errors) with the tag attached thereto is saved on the machine(s) executing the filtering processing step. The error information from these machines, including the tag associated with the filtering processing step attached thereto, is then collected and used to correlate the errors to the filtering processing step and to the data records that triggered the errors, and the correlated error information with the error detail is provided to the user in the context of the filtering processing step as shown in FIG. 3.

Thus, when processing data in a distributed data processing system that allows authoring of processing steps, the systems and methods of the present disclosure generate a graph by compiling a program file including text written by the user or based on sequences of processing steps created by the user from a GUI authoring environment of the distributed data processing system. The graph includes nodes representing the processing steps. The system assigns unique tags to the nodes (processing steps). The tag information is preserved if the graph is optimized.

When an error occurs while executing the processing steps in the graph on a cluster of machines, the tag of the corresponding node (processing step) is recorded along with the error information (the processing step and the record(s) triggering the error) on each machine in the cluster. The system collects the error information from the machines and optionally the input data record(s) that caused the error from across the distributed data processing system so that the error can be correlated to the data processing step and optionally to the record(s) that caused the error. The correlated error information is provided to the user in the context of a data processing step. Different policies are used to limit the number or size of the error causing records to be collected from each step or in total. This may occur during collection of the distributed error information or when the errors are first raised on the processing nodes.

All of the aspects of the present disclosure can be applied to batch processing as well as stream processing, where data processing is performed on a continuous flow of data. Near real time streaming data processing is becoming more common in data processing systems and distributed data processing systems. In contrast to batch processing systems, which process a batch of input data in a job, streaming systems can process a continuous stream of data records and can continue to run for very long periods. The streaming systems can be considered as a data processing job that constantly reads in new data as the new data arrives and delivers output as the output is computed.

In such streaming applications, the collected error information would also be a streaming output. When an error is encountered, the same data is collected about the errors as in the batch processing. The collection of data in a distributed data processing system occurs continuously, and the correlated error information can be provided to the user on an ongoing basis. Each computer in the cluster would write out the tagged error information, and that information is collected and reported. The transferring of information can use the same mechanisms as in batch processing systems, including writing the information to a storage system that is checked periodically by the error reporting system.

Below are simplistic examples of a distributed computing environment in which the systems and methods of the present disclosure and the data processing systems described above can be implemented. Throughout the description, references to terms such as servers, client devices, applications and so on are for illustrative purposes only. The terms servers and client devices are to be understood broadly as representing computing devices comprising one or more processors and memory configured to execute machine readable instructions. The terms applications and computer programs are to be understood broadly as representing machine readable instructions executable by the computing devices.

Figure 4:
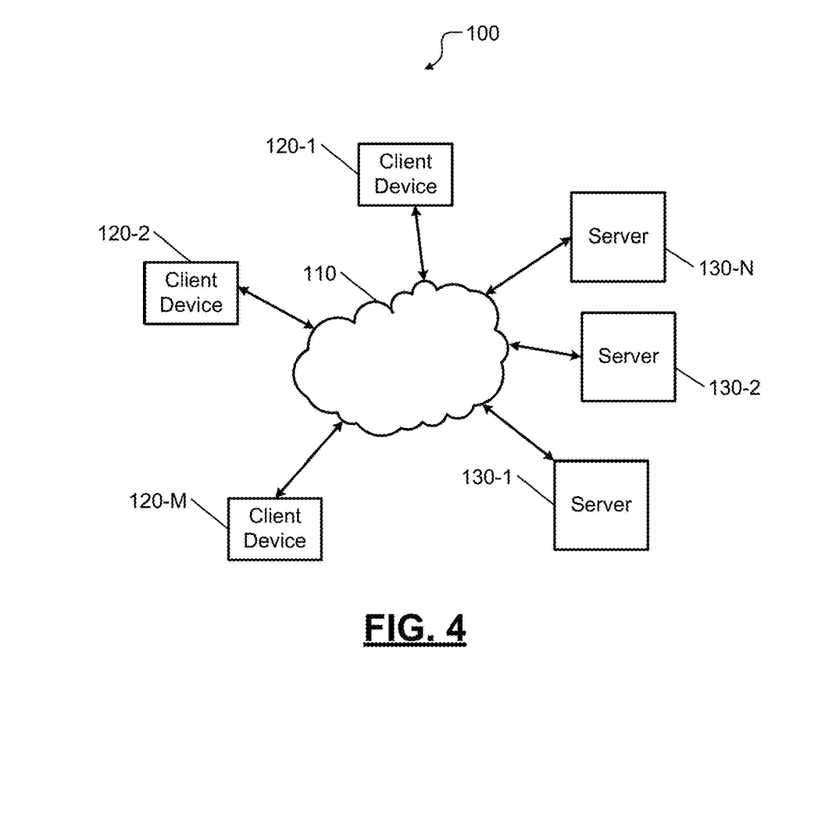
FIG. 4 is a functional block diagram of an example of a distributed network system including multiple servers providing services to multiple client devices.

FIG. 4 shows a simplified example of a distributed network system 100 that can execute a data processing system and that can implement the system and method according to the present disclosure. The distributed network system 100 includes a network 110, one or more client devices 120-1, 120-2, . . . , and 120-M (collectively client devices 120), and one or more servers 130-1, 130-2, . . . , and 130-N (collectively servers 130), where M and N are integers greater than or equal to one. The network 110 may include a local area network (LAN), a wide area network (WAN) such as the Internet, or other type of network (collectively shown as the network 110). The client devices 120 may communicate with one or more servers 130 via the network 110. The client devices 120 and the servers 130 may connect to the network 110 using wireless and/or wired connections to the network 110.

For example, the client devices 120 may include smartphones, personal digital assistants (PDAs), laptop computers, personal computers (PCs), and so on. The servers 130 may provide multiple services to users of the client devices 120. For example, the servers 130 may execute one or more distributed data processing systems that process vast amounts of data and that allow the users to author computer programs or to compose queries (sets of processing steps) using the system's GUI authoring environment to process portions of the data. In addition, one or more servers 130 may execute data processing systems that process smaller sets of data in a non-distributed environment during development of data processing flow and that allow users to author computer programs or queries to process the data. Users of the client devices 120 can access both distributed and non-distributed data processing systems running on the servers 130. The servers 130 may host multiple databases that are utilized by the various data processing system and that are used by the users of the client devices 120.

In addition, the servers 130 and/or the client devices 120 may execute a tool or a computer program for correlating errors according to the present disclosure as described above (e.g., with references to FIGS. 1-3). The tool includes machine readable instructions executable by a computing device including a processor and memory, such as the servers 130 and/or the client devices 120. The tool works in conjunction with the one or more data processing systems and performs the various functions associated with correlating errors according to the present disclosure, which are described above with references to FIGS. 1-3. The tool generates the graphs for the computer programs or for the sets of processing steps composed by a user and assigns tags to the nodes of the graph representing the processing steps as described above. The tool may also optimize the graph while preserving the original tag information as described above. One or more of the processing steps may then be executed on one or more of the servers 130.

When an error occurs while executing one of the processing steps on the one or more servers 130, the one or more servers 130 store error information including the processing step and the data records that triggered the error, with the tag of the processing step attached thereto. The tool collects the error information from the one or more servers 130 and uses the collected error information to correlate the error to the processing step and optionally to the data records that triggered the error. The tool performs the correlation based on the tag that was associated with the processing step and that was attached to the error information generated when the error occurred. The tool provides the correlated error information to the user along with error details in the context of the processing step (e.g., as shown and described with reference to FIG. 3). This enables the user to understand and diagnose the error. The tool limits the amount of error information generated, collected, and provided to the user as described above with reference to FIGS. 1-3.

For example, the users of the client devices 120 can access the various data processing systems and the tool on the one or more servers 130 via the network 110. The users of the client devices 120 can process the data using these data processing systems. The tool assists the users in tracking and correlating the errors as described above. When errors occur, the users of the client devices 120 can view the error correlation with any error details as described above.

Figure 5:
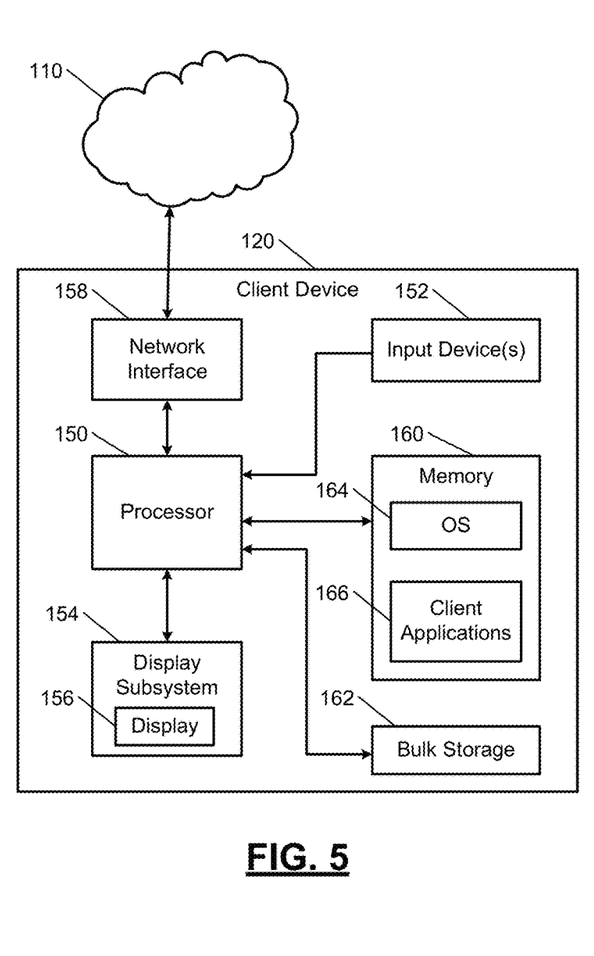
FIG. 5 is a functional block diagram of an example of a client device.

FIG. 5 shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses the one or more data processing systems and the tool executed by the one or more servers 130 via the network 110.

The tool executed by the one or more servers 130 performs the functions of generating a graph, tagging the nodes of the graph, optionally optimizing the graph, executing the processing steps of the graph, collecting error information from the one or more servers 130 when errors occur, correlating the errors to the processing steps and optionally to the data records triggering the errors, and providing the correlated error information to the user of the client device 120 in the manner described above. The tool can output the correlated error information on the display 156 of the client device 120.

Figure 6:
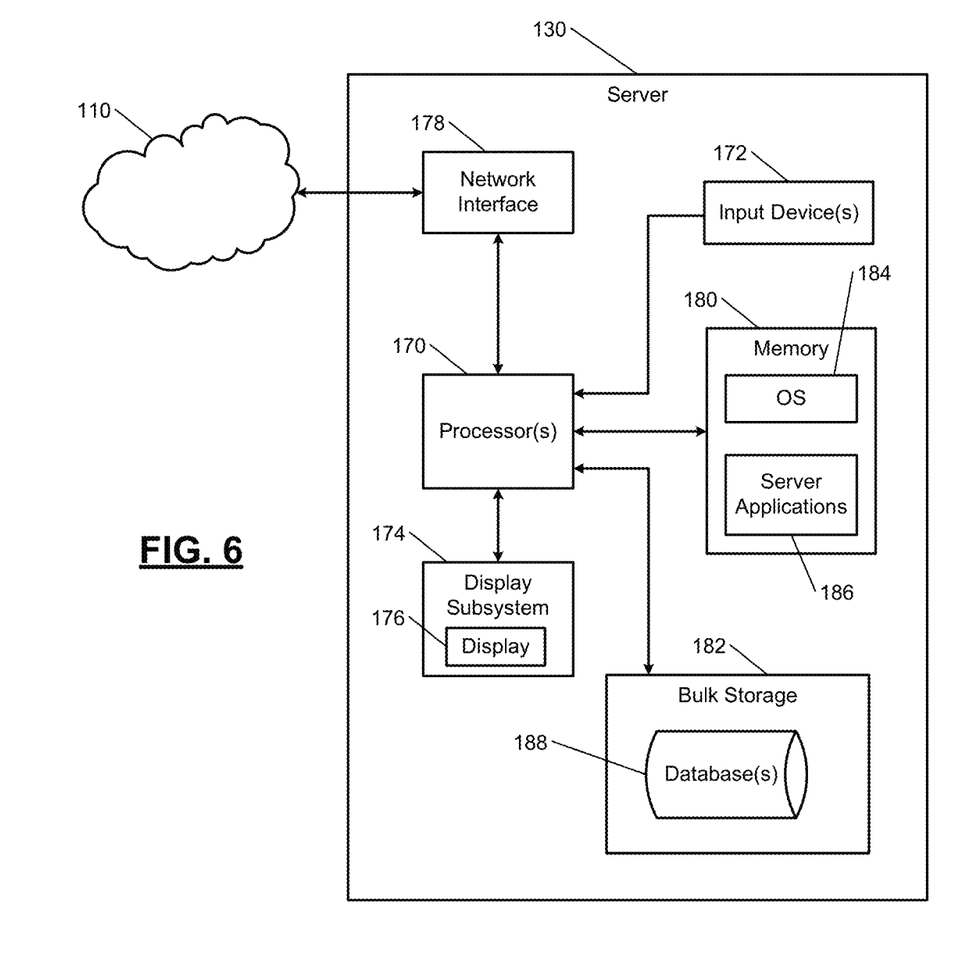
FIG. 6 is a functional block diagram of an example of a server.

FIG. 6 shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 other servers 130 and to the distributed network system 100 via the network 110, forming a cluster of the servers 130. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device. The bulk storage 182 may store one or more databases 188 that store data structures used by the server applications 186 to perform respective functions.

The processor 170 of the server 130 executes an operating system (OS) 184 and one or more server applications 186, which include the one or more data processing systems and the tool described above. The one or more data processing systems and the tool execute in a distributed manner across the cluster of the servers 130. One or more data processing systems and the tool may also be executed by one or more of the servers 130 in a non-distributed manner.

The tool collects error information from the one or more servers 130 when errors occur, correlates the errors to the processing steps and optionally to the data records triggering the errors, and provides the correlated error information to the user of the client device 120 in the manner described above. The tool can output the correlated error information on the display 156 of the client device 120 and/or on the display 176 of the server 130.

Figure 7:
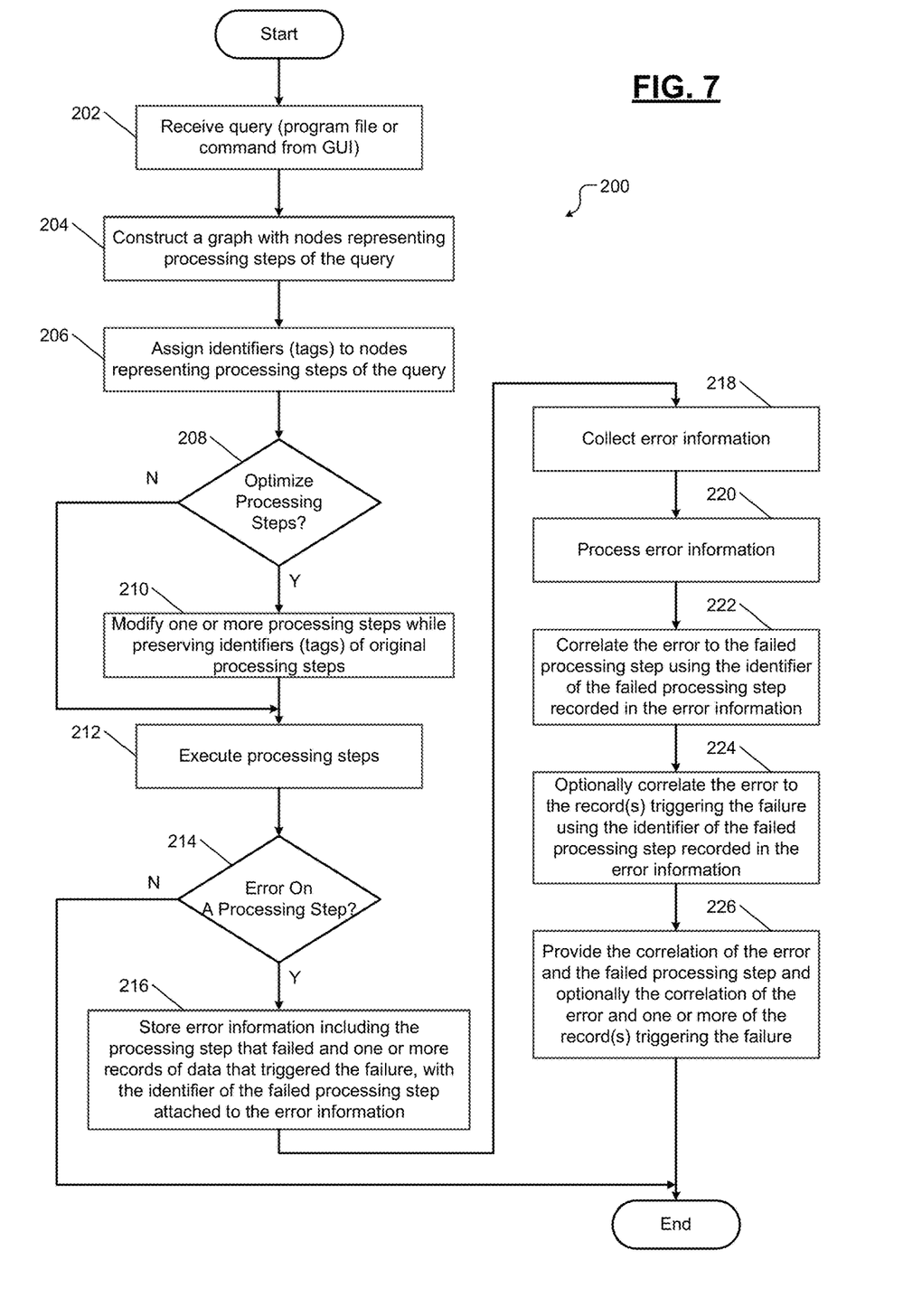
FIG. 7 is a flowchart of a method for correlating errors to processing steps and data records causing the errors, and for providing correlated error information to a user of a distributed data processing system according to the present disclosure.

FIG. 7 shows a flowchart of a method 200 for collecting and correlating error information according to the present disclosure. As used herein, control refers to one or more of a data processing system and a computer program for collecting and correlating error information according to the present disclosure.

At 202, control receives a query from a user. The query may be in the form of a computer program file including text language or a sequence of processing steps generated using a graphical user interface authoring environment of a data processing system. The user writes the query to process data using the data processing system across a cluster of computers.

At 204, control generates a processing graph including nodes representing the processing steps associated with the query. At 206, control assigns unique identifiers (tags) to the nodes of the graph. At 208, control determines whether to optimize any of the processing steps in the graph. At 210, if optimization is possible, control modifies one or more processing steps while preserving the original identifiers of the processing steps. For example, the optimization may include reordering, consolidation, deletion, or any modification of one or more of the processing steps. At 210, control executes the processing steps in the original graph or in the optimized graph if optimized.

At 214, control determines if an error occurred in a processing step. At 216, if an error occurred in a processing step, control stores error information including the processing step that failed and one or more data records that triggered the failure, with the identifier of the failed processing step attached to the error information. When the processing step is executed on multiple machines in the cluster, each machine in the cluster stores such error information. At 218, control collects the error information from each machine in the cluster. At 220, control processes the error information collected from each machine in the cluster. While not shown, control may use policies to limit the amount of error information generated and collected.

At 222, control uses the collected error information and correlates the error to the failed processing step using the identifier of the failed processing step recorded with the error information. At 224, control correlates the error to the data records triggering the error using the identifier of the failed processing step recorded with the error information. At 226, control provides the correlated error information to the user in the context of the processing step that failed. Specifically, control provides the correlation of the error and the failed processing step, and optionally the correlation of the error and the records triggering the error, along with error detail, to the user in the context of the processing step that failed. While not shown, control may use policies to limit the amount of correlated error information and error detail provided to the user. Further, a policy can also be applied before collection (e.g., in a step before 218). When an error occurs, the error may be stored on a worker server before collection. While the error is stored on the worker server, the error may be processed to reduce the number of errors stored or to reduce the size of the total information stored.

Thus, the system and method of the present disclosure solve a specific technical problem plaguing the distributed data processing industry: how to provide users with correlated error information during development and execution of a distributed data processing system, instead of merely providing text files generated when an error occurs, without correlating the error to a specific processing step and to a specific record triggering the error. Providing the correlated error information according to the present disclosure allows users to quickly and effectively understand the nature of the error, the cause of the error, and therefore how to remedy the error. The correlation process works well with a text language program file generated by the user to process data using a data processing system and also with a sequence of processing steps generated by the user using a GUI authoring environment of the data processing system. The correlation process is augmented by various additional features such as the graph optimization feature, where the original tags assigned to the processing steps are preserved to enable the error correlation, and other features such as the policies that limit the amount of information generated, collected, and processed to perform the error correlation. Further, the understanding of the errors is enhanced by limiting the amount of correlated error information provided to the user. All of these features allow the user to grasp the error correlation at a glance and to decide how to proceed (e.g., how to debug the error) in a fast and efficient manner.

The functions/steps of assigning unique identifiers to the processing steps, preserving the identifying information during optimization, and using the identifying information to correlate the errors to specific processing steps and data records triggering the errors provide specific information to the user in the form of a technical tool for an intellectual task he or she has to master, and hence contribute to the technical solution of the technical problem of understanding and debugging errors insofar as this is supported by the specific display format chosen. In this respect, it is neither mere aspects of art design, like a pleasant look or feeling, that matter, nor the mere information content of the error correlation presented, but the organization of an overall display structure in view of a technical problem.

The system and method of the present disclosure solve this problem by providing a set of error correlating functions (e.g., the tagging, optimizing, and limiting features described above), which, when applied in a concerted manner by the user as described above, ensure a time-saving and well-manageable error correlation operation as compared to the prior art. In the technical context of a distributed data processing system allowing processing of vast amounts of data, these functions combine to yield a fast, easy to handle, and in summary, an efficient error correlation tool, which goes beyond the mere aggregation of normal design options.

The system and method of the present disclosure do not merely render information in an artistic or automated manner but render limited and specific correlation information about the errors encountered while using a distributed data processing system in a focused manner that allows the user to understand exactly where and why the errors occurred, where the error correlation is based on the specific information (tags) assigned to the processing steps, which are preserved during optimization, and which are attached to the error information that is generated on each machine when an error occurs. Notably, the entire text files that are generated when an error occurs from all the machines are not provided to the user, which can overwhelm the viewer with a lot of information that is difficult to review and analyze. Instead, the technical tool according to the present disclosure can select and analyze the error information from these machines, selected efficiently based on the specific tagging used before executing the processing steps, and limited in volume using various policies as described above. This is a significant technical effect and improvement over the prior art in the technical field of error correlation in distributed data processing systems.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a processor and memory; and
machine readable instructions, when executed by the processor and memory, configured to:
receive one or more commands from a computer program file;
assign a first set of identifiers to different portions of the computer program file to link errors occurring during execution of one or more of a plurality of processing steps to corresponding portions of the computer program file;
execute the plurality of processing steps to process data in a data processing system distributed over a plurality of nodes in a cluster, each of the processing steps having a unique tag, wherein each of the nodes is a computing device;
compose a graph including vertices representing the plurality of processing steps;
assign tags to the vertices;
access a policy that limits an amount of error information collected for each of the processing steps;
based on a determination that a limit for a first processing step of the processing steps on the plurality of nodes has not been reached, collect, from the plurality of nodes, in response to an error occurring on executing the first processing step, information about the error stored on the plurality of nodes, the information about the error including the first tag associated with one of the vertices representing the first processing step in the graph;
process the information about the error from the plurality of nodes to correlate the error to the first processing step based on the first tag that is associated with the first processing step and that is included in the information about the error stored on the plurality of nodes;
generate, based on the processed information, correlation between the error and the first processing step, wherein the correlation between the error and the first processing step indicates a cause and a location of the error; and
present the generated correlation to a user.

2. The system of claim 1 wherein the machine readable instructions are further configured to:
in response to one or more of the plurality of processing steps being modified by reordering, consolidating, or discarding the one or more steps prior to executing the plurality of processing steps, retain tags of the one or more processing steps being modified with the modified one or more processing steps,
wherein the retained tags are used to correlate one or more errors to the one or more processing steps in the event of the modification.

3. The system of claim 1 wherein the machine readable instructions are further configured to assign the first set of tags to different portions of the text in the computer program file to link the errors occurring during execution of the one or more of the plurality of processing steps to the corresponding portions of the text in the computer program file.

4. The system of claim 1 wherein the machine readable instructions are further configured to execute the plurality of processing steps by compiling one or more commands for processing the data and to associate the plurality of processing steps and the corresponding tags to respective portions of the one or more commands to identify a portion of the one or more commands causing the error.

5. The system of claim 1 wherein the machine readable instructions are further configured to:
generate information at each of the plurality of nodes for less than or equal to a predetermined number of errors;
collect information from each of the plurality of nodes about less than or equal to a predetermined number of tags; or
provide the correlation for less than or equal to a predetermined number of errors.

6. The system of claim 1 wherein the plurality of processing steps process the data in a batch processing mode.

7. The system of claim 1 wherein the plurality of processing steps process the data in a streaming mode.

8. A method for correlating errors in a data processing system, the method comprising:
receive one or more commands from a computer program file;

assign a first set of identifiers to different portions of the computer program file to link errors occurring during execution of one or more of a plurality of processing steps to corresponding portions of the computer program file;

executing the plurality of processing steps to process data in a data processing system distributed over a plurality of nodes in a cluster, each of the processing steps having a unique tag, and each of the nodes being a computing device;

composing a graph including vertices representing the plurality of processing steps;

assigning tags to the vertices;

access a policy that limits an amount of error information collected for each of the processing steps;

based on a determination that a limit for a first processing step of the processing steps on the plurality of nodes has not been reached, collecting, from the plurality of nodes, in response to an error occurring on executing the first processing step, information about the error stored on the plurality of nodes, the information about the error including a first tag associated with one of the vertices representing the first processing step in the graph;

processing the information about the error from the plurality of nodes to correlate the error to the first processing step based on the first tag that is associated with the first processing step and that is included in the information about the error stored on the plurality of nodes;

generating, based on the processed information, correlation between the error and the first processing step, wherein the correlation between the error and the first processing step indicates a cause and a location of the error;

present the generated correlation to a user.

9. The method of claim 8 further comprising:
collecting, from the plurality of nodes in the cluster, in response to the error occurring on executing the first processing step on the plurality of nodes in the cluster, one or more records of data triggering the error included in the information about the error stored on the plurality of nodes in the cluster;

processing the information about the error from the plurality of nodes in the cluster including the one or more records of data triggering the error to correlate the error to the one or more records of data triggering the error based on the first tag that is associated with the first processing step and that is included in the information about the error; and generating, based on the processed information, correlation between the error and the one or more records of data triggering the error to provide additional information about the cause and the location of the error.

10. The method of claim 8 further comprising:
assigning the first set of tag to different portions of the text in the computer program file to link errors occurring during execution of the one or more of the plurality of processing steps to the corresponding portions of the text in the computer program file.

11. The method of claim 8 further comprising:
executing the plurality of processing steps by compiling one or more commands for processing the data; and
associating the plurality of processing steps and the corresponding tags to respective portions of the one or more commands to identify a portion of the one or more commands causing the error.

12. The method of claim 8 further comprising:
generating information at each of the plurality of nodes for less than or equal to a predetermined number of errors;
collecting information from each of the plurality of nodes about less than or equal to a predetermined number of tags; or
providing the correlation for less than or equal to a predetermined number of errors.

13. A system for correlating errors in a data processing system, the system comprising:
a processor and memory; and
machine readable instructions, when executed by the processor and memory, configured to:
receive one or more commands from a computer program file;
assign a first set of identifiers to different portions of the computer program file to link errors occurring during execution of one or more of a plurality of processing steps to corresponding portions of the computer program file;
execute the plurality of processing steps to process data in a data processing system distributed over a plurality of nodes in a cluster, each of the processing steps having a unique tag, and wherein each of the nodes is a computing device;
compose a graph including vertices representing the plurality of processing steps;
assign tags to the vertices;
access a policy that limits an amount of error information collected for each of the processing steps;
based on a determination that a limit for a first processing step of the processing steps on the plurality of nodes has not been reached, collect, from the plurality of nodes, in response to an error occurring on executing the first processing step, information about the error stored on the plurality of nodes, the information about the error including one or more records of data triggering the error and a first tag associated with one of the vertices representing the first processing step in the graph;
process the information about the error from the plurality of nodes to correlate the error to the first processing step based on the first tag that is associated with the first processing step and that is included in the information about the error stored on the plurality of nodes;
generate, based on the processed information, correlation between the error and at least one of the first processing step and the one or more records of data triggering the error, wherein the correlation between the error and at least one of the first processing step and the one or more records of data triggering the error indicates a cause and a location of the error; and
present the generated correlation to a user.

14. The system of claim 13 wherein the machine readable instructions are further configured to execute the plurality of processing steps by compiling one or more commands for processing the data and to associate the plurality of processing steps and the corresponding tags to respective portions of the one or more commands to identify a portion of the one or more commands causing the error.

15. The system of claim 13 wherein the machine readable instructions are further configured to:
collect, from the plurality of nodes in the cluster, in response to the error occurring on executing the first processing step on the plurality of nodes in the cluster, one or more records of data triggering the error included in the information about the error stored on the plurality of nodes in the cluster;

process the information about the error from the plurality of nodes in the cluster including the one or more records of data triggering the error to correlate the error to the one or more records of data triggering the error based on the first tag that is associated with the first processing step and that is included in the information about the error; and generate, based on the processed information, correlation between the error and the one or more records of data triggering the error to provide additional information about the cause and the location of the error.

16. The system of claim 13 wherein the machine readable instructions are further configured to assign the first set of tags to different portions of the text in the computer program file to link the errors occurring during execution of the one or more of the plurality of processing steps to the corresponding portions of the text in the computer program file.

17. The system of claim 13 wherein the machine readable instructions are further configured to generate information at each of the plurality of nodes for less than or equal to a predetermined number of errors.

18. The system of claim 13 wherein the machine readable instructions are further configured to:

collect information from each of the plurality of nodes about less than or equal to a predetermined number of tags; or provide the correlation for less than or equal to a predetermined number of errors.

19. The system of claim 13 wherein the plurality of processing steps process the data in a batch processing mode.

20. The system of claim 13 wherein the plurality of processing steps process the data in a streaming mode.

* * * * *